United States Patent [19]
Weikel

[11] Patent Number: 5,769,590
[45] Date of Patent: Jun. 23, 1998

[54] GRAIN SWEEP DRIVE APPARATUS

[76] Inventor: Charles W. Weikel, 500 Fulton, Geneva, Ill. 60134

[21] Appl. No.: 697,644

[22] Filed: Aug. 29, 1996

[51] Int. Cl.⁶ .................................................. B65G 65/38
[52] U.S. Cl. .......................... 414/321; 414/319; 414/326
[58] Field of Search ..................................... 414/304–322, 414/326, 327; 198/300, 518; 305/121, 153

[56] References Cited

U.S. PATENT DOCUMENTS

| | | | |
|---|---|---|---|
| 1,316,627 | 9/1919 | McKenzie | 305/121 X |
| 1,340,514 | 5/1920 | Allen | 305/121 X |
| 2,618,516 | 11/1952 | Smith | 305/153 X |
| 3,207,332 | 9/1965 | Buschbom | 414/320 |
| 3,338,636 | 8/1967 | Chapman et al. | 414/313 X |
| 3,451,566 | 6/1969 | Hanson | 414/321 X |
| 3,647,094 | 3/1972 | Jackson | 414/310 X |
| 4,708,567 | 11/1987 | Greeb | 414/310 |
| 4,772,173 | 9/1988 | Buschbom et al. | 414/310 X |
| 5,449,263 | 9/1995 | Campbell et al. | 414/320 |

FOREIGN PATENT DOCUMENTS 3151483  7/1983  Germany ................................ 414/310

Primary Examiner—David A. Bucci
Attorney, Agent, or Firm—Rockey, Milnamow & Katz, Ltd.

[57] ABSTRACT

A drive mechanism for a radially extending grain sweeper that includes an auger for directing grain into a central opening in the floor portion of a grain storage container, said drive mechanism includes a housing coupled with the grain sweeper, a drive sprocket and tensioning sprocket mounted within the housing, a crawler track which engages the drive and tensioning sprocket. The crawler track includes a chain to which cleats are coupled in spaced fore and aft relation for engaging grain and the floor portion for supporting the grain sweeper. The cleats are adapted to dig into the grain and move grain with a paddling action to generally hinder the grain sweeper from riding up over compacted layers of grain.

19 Claims, 4 Drawing Sheets

GRAIN SWEEP DRIVE APPARATUS

BACKGROUND OF THE INVENTION

Field of the Invention

This invention relates to drive mechanisms for propelling a grain sweeping device across the floor of a grain silo.

Grain crops such as corn are often stored in large cylindrical storage containers or silos. A small opening is typically provided in the center of the floor of the silo. Grain will flow through this central opening under the force of gravity to at least partially empty the silo. However, some grain remains stacked inside the silo against the inner surfaces of the silo's side walls after this initial emptying step. It is known to provide a grain sweeping mechanism for directing the remainder of grain into the central opening so that the silo is completely emptied.

Conventional grain sweeping devices include an auger which extends linearly outwardly from the central opening to the outer wall of the silo. Rotation of the auger will force grain to be directed toward and into the central opening. The inner portion of the auger is pivotally fixed near the center of the silo adjacent the central opening such that the auger mechanism can swing in an arc about the central opening. These sweeper devices are typically provided with a drive mechanism that will swing the auger in an arc around the central opening so that the auger will move all of the grain within the silo and thereby completely empty the silo of grain. Conventional drive mechanisms typically include a drive wheel operatively mounted behind the outer end of the auger. These drive wheels are hydraulically driven and are intended to engage the floor of the silo for driving the grain sweeper in an arc about the central opening when hydraulic power is supplied to the drive wheel.

Conventional grain sweepers operate on the floor of the silos, and remain in position on the floor before, during and after periods of operation. Therefore, the sweeper mechanisms are often submerged beneath a large amount of grain. After the silo is partially emptied of grain by gravity, large amounts of grain remain piled on top of the grain sweeper within the silo. The sweeper mechanism is positioned on the floor of the silo and beneath this residual grain. The drive mechanism must therefore be sufficiently forceful to drive the sweeper forwardly even while submerged in grain. Conventional drive wheels often do not provide enough traction and drive force to properly propel the sweeper forwardly when submerged beneath large amounts of grain. A stuck sweeper must be dislodged manually, which can be a difficult and dangerous operation.

The great weight bearing down on the lowest layers of grain when the silo is full often causes the lower levels of grain to become compacted and hardened. When the sweeper travels around in its arc the sweeper can have a tendency to ride up over the hardened layers. The drive wheel or tire does not prevent the sweeper from riding up over hardened layers. When the auger is allowed to rise up in this manner, the grain over which the sweeper passes is not acted on by the auger. This grain remains compacted and stationary and is not moved toward the central opening in the floor of the silo. The silo remains only partially emptied, and manual removal of the remaining grain with its inherent problems is required.

It would therefore be desirable to provide a sweeper mechanism that completely removes grain from a container or silo without use of manual labor. It would be desirable for such a mechanism to generally prevent the sweeper from riding up over layers of compacted grain. It is also desirable for such a mechanism to generally disperse, break up and loosen compacted areas of grain so that the the auger can effectively direct the loosened grain toward the floor's central opening for removal from the silo, thereby completely emptying the silo.

BRIEF SUMMARY OF THE INVENTION

The present invention provides a novel drive mechanism for a grain sweeper. The grain sweeper includes a conventional auger and shroud which extend radially from a central opening in the floor of a grain storage container or silo. The rotating auger acts to direct grain toward and into the central opening for emptying the grain from the silo in a conventional manner. The drive mechanism according to the present invention drives the grain sweeper in an arc about the central opening so that grain is more completely emptied from the silo. The drive mechanism includes a housing which is mounted to the shroud of the sweeper. Within the housing is mounted a drive sprocket and tensioning sprocket. These sprockets support a crawler track mechanism which engages the floor of the silo for supporting the grain sweeper and driving the grain sweeper in its arc about the central opening. Hydraulic hose lines mounted to the shroud supply hydraulic power to a motor which drives a gear box mounted to the top of the housing. An output shaft of the gearbox drives a first sprocket and chain. The chain engages a second sprocket which is fixed to a driven shaft. The drive sprocket is fixed for rotation with the driven shaft, and serves to drive the crawler track during operation. The crawler track includes a track chain which is engaged by the fingers of the drive sprocket and tensioning sprocket. Novel laterally extending cleats are operatively mounted to the track chain and are spaced fore and aft from one another. The cleats engage the floor of the silo and thereby support the drive mechanism and grain sweeper. The small surface area of the cleats are designed to generally dig into any grain that may be positioned beneath the cleat. As the cleats digs into the grain, they also move grain rearwardly with a paddling action. This allows the cleats to generally break up compacted layers of grain that have become compressed on the floor of the silo beneath the crawler track mechanism. By breaking up and moving this compacted grain beneath the crawler track, the crawler track and grain sweeper will return to the floor of the silo and thereby more completely empty the silo of its contents. A deflector member is mounted to the housing directly in front of the crawler track and serves to generally deflect grain from the path of the crawler track and further helps the drive mechanism directly engage the surface of the silo's floor. Thereby permitting the grain sweeper to more completely empty the grain from the silo. Two stacks of weights are supported on top of the housing. One stack is positioned generally directly above the tensioning sprocket and the other stack is positioned generally directly above the drive sprocket. The weight of these stacks press the cleats down into the compacted layers of grain and increases the drive mechanism's traction. The number of weights in each stack can be changed to adjust the weight distribution of the drive mechanism and maximize the traction and digging action of the cleats.

DETAILED DESCRIPTION OF THE INVENTION

Figure 1:
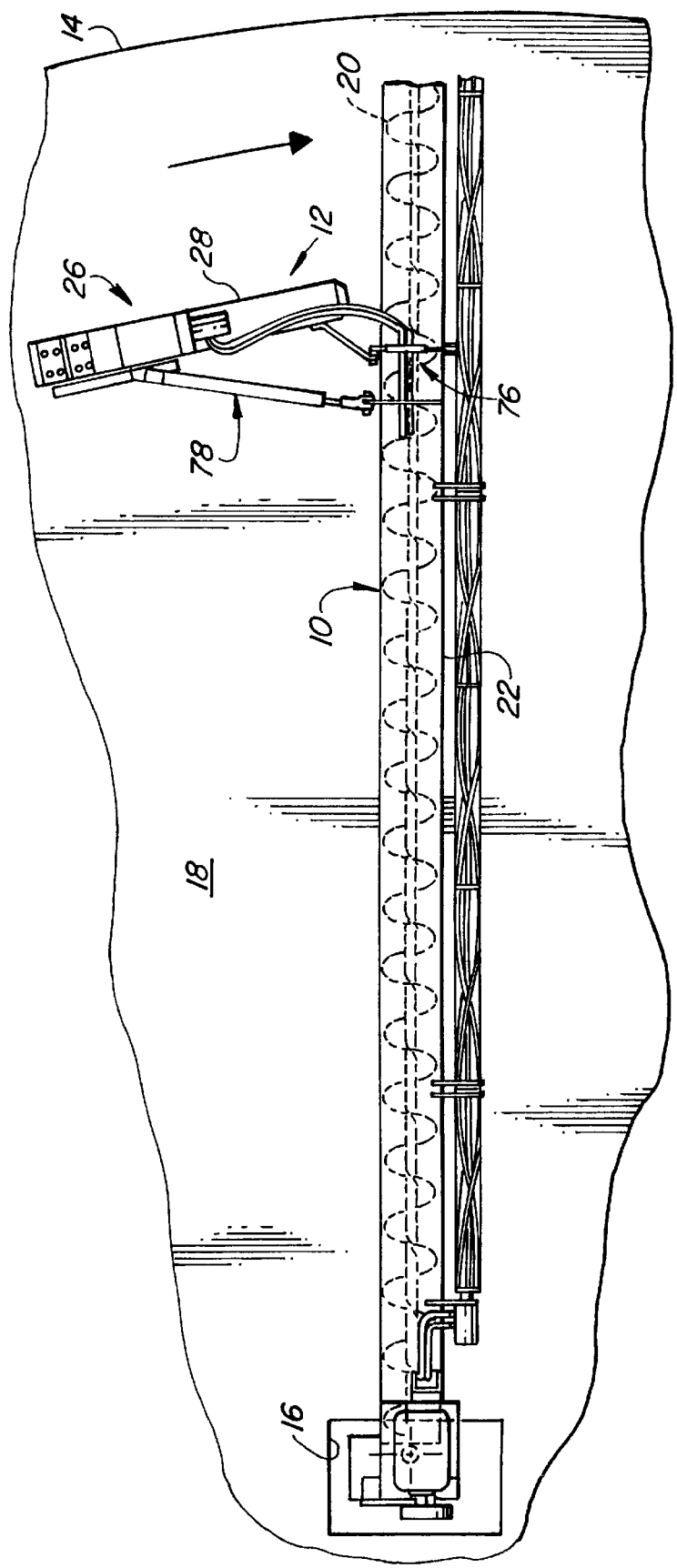
FIG. 1—is a perspective view of the apparatus of the invention.

Referring now to the drawings, there is shown a grain sweeping device 10 having a drive mechanism 12 according to the preferred embodiment of the present invention. The grain sweeper 10 is adapted to empty the grain from the silo 14 by directing the grain toward and into a central opening 16 in the center of the silo's floor 18. The sweeper 10 includes an auger mechanism 20 positioned within a tubular shroud 22. The rotating auger 20 engages grain in a conventional manner near the floor 18 of the silo 14 and directs it toward the central opening 16 in the floor 18. The sweeper device 10 is pivotally coupled to a mounting structure 24 at the center of the silo 14. A drive mechanism 12 according to the present invention propels the sweeper 10 in an arc about the mounting structure 24 and central opening 16. As the sweeper 10 travels about the central opening 16, the sweeper 10 will travel across the entire surface of the floor 18, thereby generally clearing all the grain from the silo's floor 18.

The drive mechanism 12 according to the present invention includes a novel endless crawler track mechanism 26 which is hydraulically driven. The track 26 is positioned within a housing 28 which is operatively coupled with the tubular shroud 22. Hydraulic hose lines 30 mounted to the exterior of the shroud 22 are operatively fluidly coupled with a hydraulic motor 32. The motor 32 is coupled with a set of speed reducer gears 34 within a gearbox 36 which is mounted to the top of the housing 28. The gearbox 36 includes an output shaft 38 to which a first sprocket 40 is fixed. A chain 42 engaged with the first sprocket 40 also engages a second sprocket 44. A chain guard 46 is positioned over and generally surrounds and encloses the chain 42. The second sprocket 44 is fixed to a driven shaft 48 which is rotatively supported by bearings 50 positioned within shaft support members 52. The shaft support members 52 are bolted to the side walls 54 of the housing 28. A drive sprocket 56 is also fixed with the driven shaft 48 within the housing 28. The drive sprocket 56 engages a crack chain mechanism 58 which forms part of the crawler track 26. The track chain 58 is also engaged by a tensioning sprocket 60 which is positioned near the front of the housing 28. The tensioning sprocket 60 is fixed with a tensioning shaft 62 supported by bearings 64 within tensioning shaft support members. The support members are bolted or otherwise fixed to the side walls 54 of the housing 28. Slots 68 in the side walls 54 of the housing 28 receive bolts which fix the support members to the housing 28. The slots 68 allow the support members to be shifted fore and aft to a plurality of different locations so that the tension in the track chain 58 can be adjusted as desired. An elongated opening 72 in the side wall 54 of the housing 28 accomodates fore and aft shifting of the tensioning shaft 62 during tension adjustment operations.

The housing 28 is coupled to the shroud 22 by way of a height adjustment mechanism 74, an angle adjustment mechanism 76 and a draw bar assembly 78. The height adjustment mechanism 74 includes a threaded member 80 that can be adjusted for selectively altering the height at which the shroud 22 is held above the floor 18 of the silo 14 by the drive mechanism 12. The angle adjuster 76 includes a turnbuckle device 82 that can be manipulated to adjust the angle at which the shroud 22 and auger 20 are held with respect to the housing 28. The operator can thereby selectively adjust the angle at which the auger 20 engages the grain to maximize movement of grain. The drawbar assembly 78 helps rigidify the mounting of the shroud 22 with respect to the housing 28 and helps transmit driving forces from the housing 28 to the shroud 22.

The crawler track 26 according to the present invention includes a track chain 58 engaged by the drive sprocket 56 and the tensioning sprocket 60. The track chain 58 is also engaged by a plurality of idler sprockets 84 mounted to the housing 28. The idler sprockets 84 help maintain the lower run 86 of the chain 58 in engagement with the floor 18 of the silo 14. The chain 58 includes link members 88 that are engaged by the fingers of the respective sprockets 56 and 60. Channel members 90 are fixed as by welds to links 88 of the chain 58. Bolted within the channel members 90 are urethane cleats 94. The cleats 94 are adapted to engage the floor 18 of the silo 14 for generally supporting the housing 28 and drive mechanism 12 and for providing driving traction. The cleats 94 extend generally laterally and are spaced fore and aft from one another. The operational advantages of the cleats 94 according to the present invention will be described in greater detail below.

Figure 2:
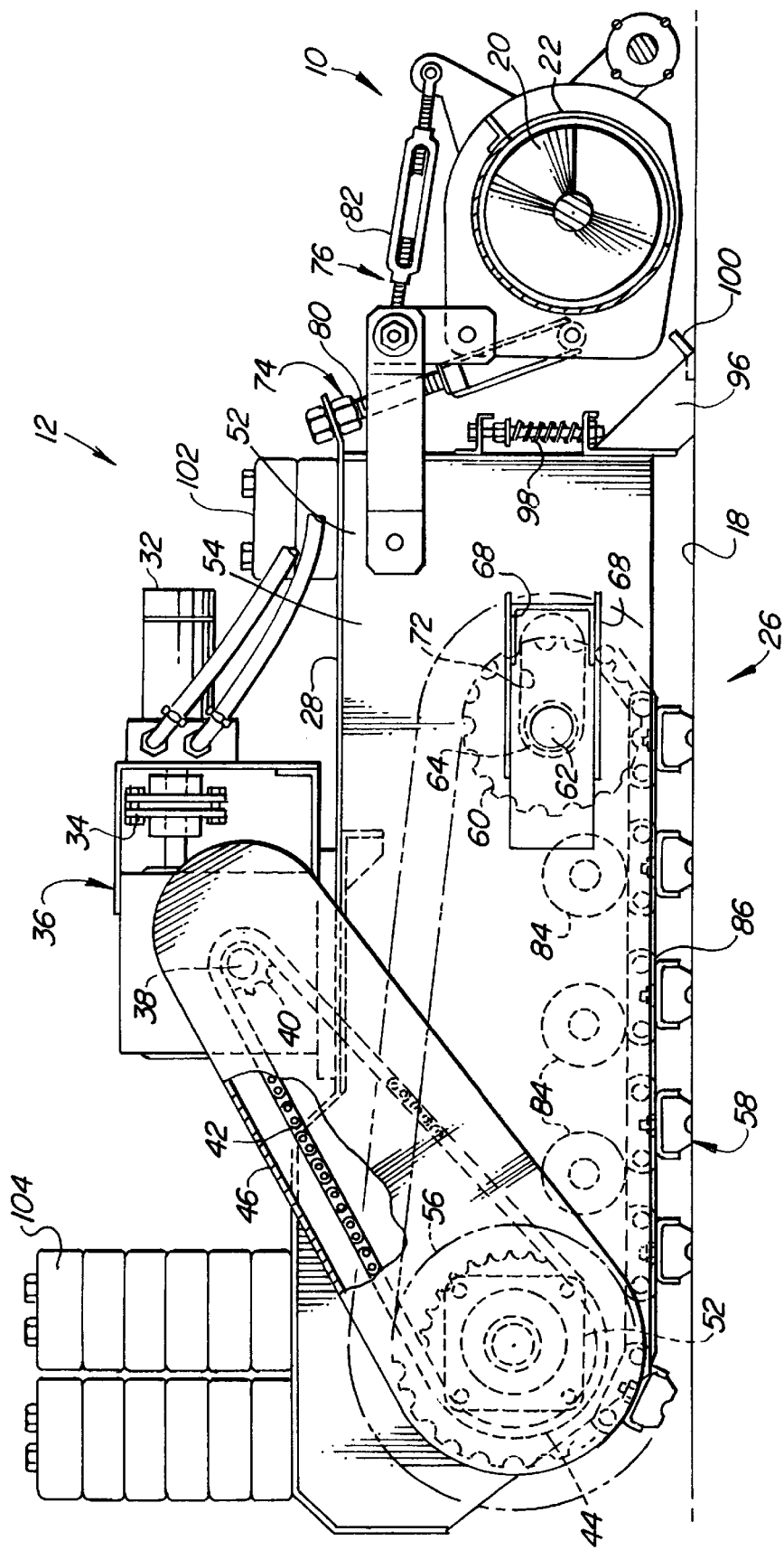
FIG. 2—is a side view of the auger unit and its drive mechanism.
Figure 3:
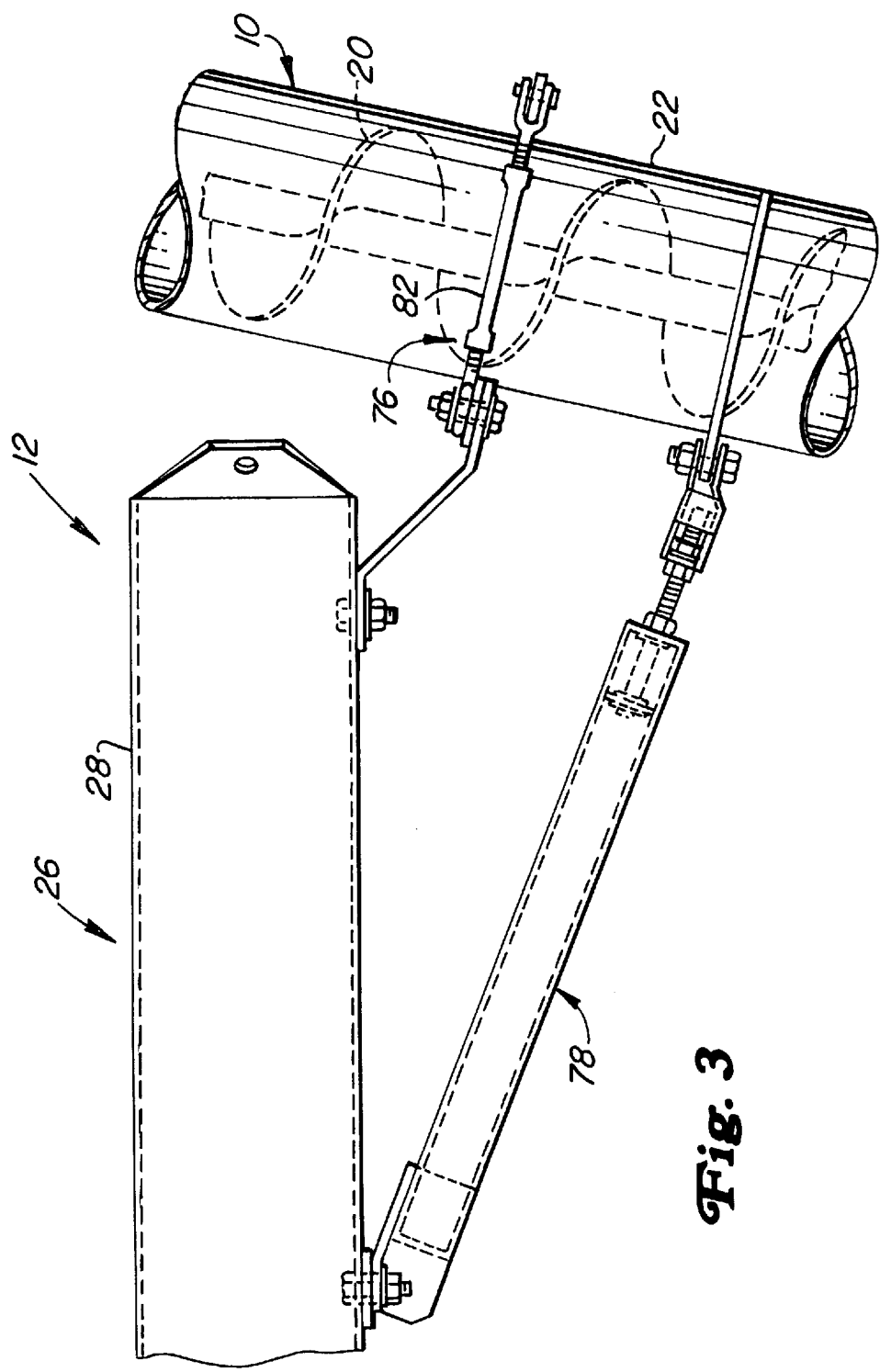
FIG. 3—is a view showing the angular adjustment mechanism of the unit.
Figure 4:
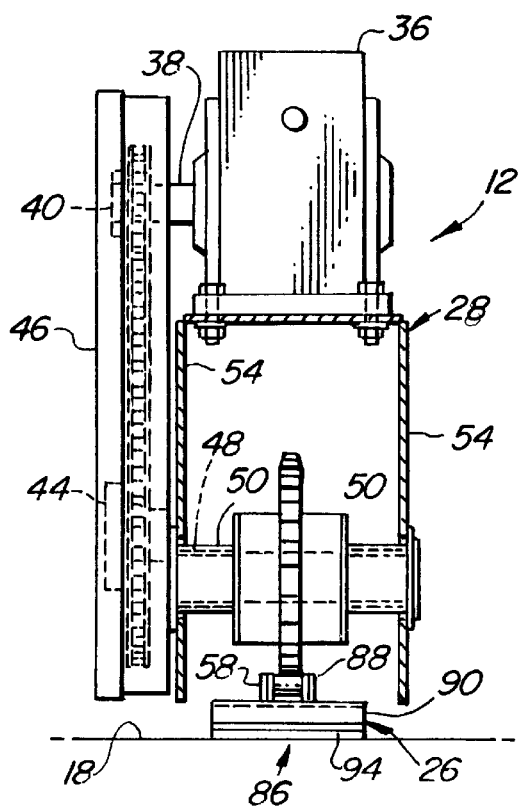
FIG. 4—is a sectional view showing the drive mechanisms of the invention.
Figure 5:
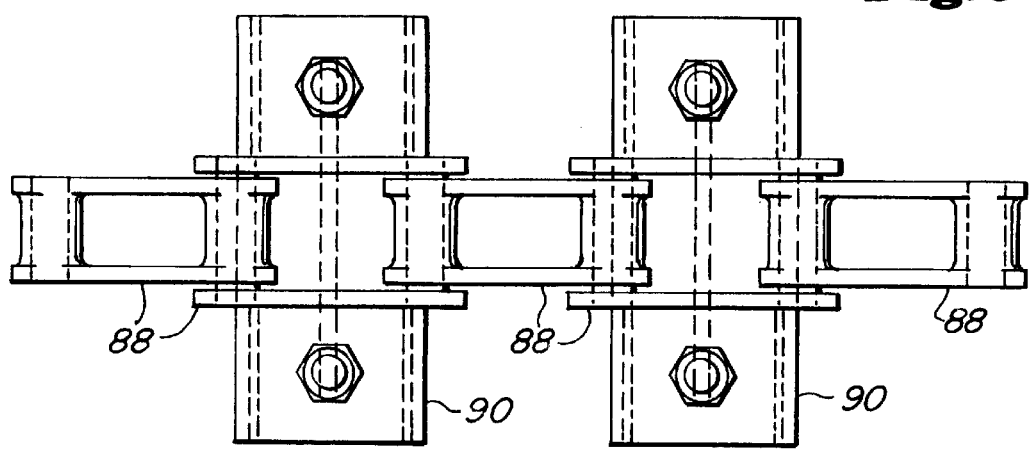
FIG. 5—is a detailed view of the track mechanism of this invention.
Figure 6:
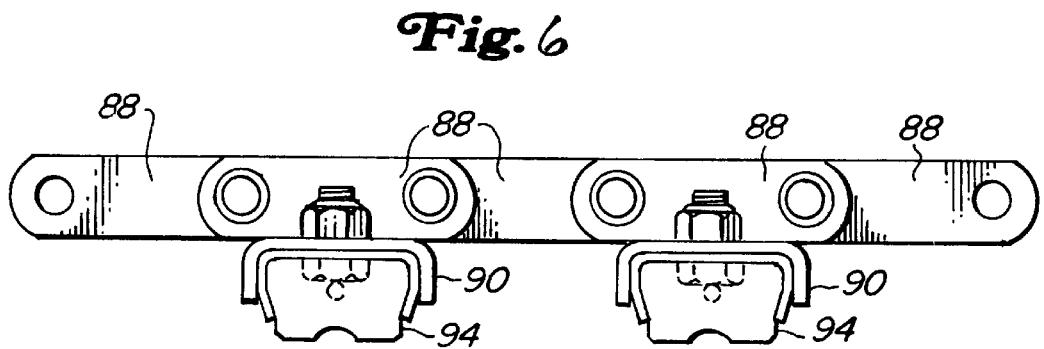
FIG. 6—is a side view of the track mechanism shown in FIG. 5.

As seen in FIG. 2, a deflector member 96 is mounted to the front portion of the housing 28. The deflector 96 is positioned directly in front of the crawler track 26 to deflect or plow grain to the sides of the housing 28 so that the crawler track 26 will have relatively clean floor 18 to engage. The traction and driving force of the crawler track 26 is thereby enhanced when the deflector 96 clears a path for the crawler track 26 to directly contact the silo floor 18. The deflector 96 is V-shaped to generally plow through grain laying on the silo floor 18. A biasing spring 98 is operatively mounted between the housing 28 and the deflector 96 to thereby urge the deflector 96 downwardly. The spring 98 helps press the deflector 96 into compacted grain, but allows the deflector 96 to shift upwardly when extremely compacted layers of grain are encountered. This prevents the grain sweeper 10 from getting stuck when the deflector 96 travels into hardened clumps of grain. An upturned front portion 100 of the deflector 96 is provided to help guide the deflector 96 over severely compacted layers of grain.

Next, the operation of the present invention will be discusssed in greater detail. When the silo 14 is full of grain, the grain sweeper 10 and drive mechanism 12 are positioned on the floor 18 of the silo 14 beneath large amounts of grain. To empty the silo 14, the central opening 16 is opened to allow grain to flow out of the silo 14. Once grain has stopped flowing through the central opening 16 under the force of gravity, the grain that remains in the silo 14 must be more actively directed into the central opening 16. Operation of the grain sweeper 10 is then initiated to move this residual grain into the central opening 16. When the grain sweeper 10 is operating the rotating auger 20 moves grain toward and into the central opening 16. As the auger 20 rotates, the drive mechanism 12 will operate to move the grain sweeper 10 in an arc about the central opening 16 such that the auger 20 will eventually travel across the entire surface of the silo floor 18. This allows the auger 20 to gradually move the remaining grain into the central opening 16, thereby effectively emptying the silo 14 of grain.

During operation the drive mechanism 12 receives hydraulic power from hydraulic hose lines 30 mounted to the shroud 22. The hydraulic fluid drives the motor 32, which in turn drives the reduction gears 34 in the gear box 36. The gear box output shaft 38 and first sprocket 40 are thereby caused to rotate. The chain 42 engaged by the teeth of the first sprocket 40 rotate therewith, which causes the second sprocket 44 to rotate. The drive shaft 48 and drive sprocket 56 rotate with the second sprocket 44. Rotation of the drive sprocket drives the track chain 58. The cleats 94 coupled with the track chain 58 engage the silo floor 18 and provide driving traction which propells the drive mechanism 12 and grain sweeper 10 in an arc within the silo 14.

The deflector 96 of the scraper mechanism is designed to deflect grain from in front of the crawler 26 to thereby allow the crawler track 26 to directly engage the silo floor 18. Drive traction is thereby enhanced. However, lower layers of grain may become compacted to such a degree that the grain sweeper 10, deflector 96 and drive mechanism 12 ride up over the compacted layer of grain. When this occurs, the cleats 94 will engage the compacted layer of grain and not the silo floor 18. As the chain track 58 rides up over the compacted layer the auger 20 is held up off the silo floor 18 and leaves grain therebeneath. The drive mechanism 12 according to the present invention is designed to minimize the negative effects of the sweeper 10 riding up over compacted layers of grain. As the cleats 94 engage the grain some slippage will occur. As the cleats 94 slip across the top surface of the compacted layer of grain, the cleats 94 will dig into and begin to break up the compacted layer. The cleats 94 are spaced fore and aft from each other to allow the cleats 94 to aggressively dig into the grain. The small surface area of the cleats 94 also helps the cleats dig into the grain. As they slip rearwardly across the surface of the compacted layer the laterally extending cleats 94 will also move grain rearwardly with a paddling action. This digging and rearward paddling or movement of grain will eventually errode compacted layers such that the auger 20 will be supported at a lower and lower height above the silo floor 18. The cleats 94 of the chain track 58 will eventually regain contact with the floor 18 and thereby allow the auger 20 to shift the residual grain into the central opening 16.

The present invention provides two stacks 102 and 104 of weights which are placed generally directly above the drive sprocket 56 and the tensioning sprocket 60 for applying extra downforce to the drive mechanism 12 to thereby enhance traction. The number of weights in each stack 102 and 104 can be selectively adjusted to acheive the desired weight distribution between the front and rear of the drive mechanism 12. The drive mechanism's ability to plow through or dig into compacted layers of grain may also be optimized by adjusting the weight distribution.

Having described the preferred embodiment, other features of the present invention will undoubtedly occur to those versed in the art, as will numerous modifications and alternations in the embodiments of the invention illustrated, all of which may be achieved without departing from the spirit and scope of the invention as defined in the appended claims.

What is claimed is:

1. A mechanism comprising:
    a grain sweeper mechanism which extends radially from a central opening into which the grain sweeper directs grain as the grain sweeper travels in a circular path about the central opening, said grain sweeper mechanism further comprising an auger member adapted to direct grain toward the central opening of a grain storage container;
    a housing operatively coupled with the grain sweeper mechanism; and
    a crawler track mounted within the housing said crawler track further comprises laterally extending cleat means for engaging grain and the floor portion of the grain storage container, said cleat means being spaced a distance fore and aft from one another for allowing said cleat means to dig down into and loosen layers of hardened grain, and said cleat means extend a significant distance in a vertical dimension as the cleat means engage the grain and floor portion of the grain storage container, the vertical dimension of said cleat means serving to paddle grain which has been loosened by the cleat means rearwardly and laterally with respect to the cleat means when said cleat means slip with respect to the floor, each of said cleat means having a surface area of sufficient size to establish friction for driving the grain sweeper mechanism about the central opening when said surface engages grain and a floor portion of the grain storage container, and said surface is sufficiently small to allow the cleat means to dig into grain.

2. The invention of claim claim 1, wherein said crawler track further comprises a chain mechanism to which the cleat means are coupled, said chain mechanism being engaged by a drive sprocket and a tensioning sprocket.

3. The invention of claim 1, and further comprising a drive sprocket engaged with the crawler track, and a tensioning sprocket engaged with the crawler track.

4. The invention of claim 3, and further comprising at least one idler which engages the crawler track and maintains portions of the crawler track in engagement with the floor portion of the grain storage container.

5. The invention of claim 1, and further comprising a first set of weights supported by the housing generally directly above the drive sprocket, and a second set of weights supported by the housing generally directly above the tensioning sprocket, the amount of said weights being adjustable for altering the balance of weight transmitted to the crawler track.

6. The invention of claim 1, and further comprising:
    a deflector mounted to the housing directly in front of the crawler track, said deflector being biased downwardly for deflecting material from the floor portion in front of the crawler track as the grain sweeper travels forwardly during operation.

7. The invention of claim 5, and further comprising:
    a deflector mounted to the housing directly in front of the crawler track, said deflector being biased downwardly for deflecting material from the floor portion in front of the crawler track as the grain sweeper travels forwardly during operation.

8. A drive mechanism for a grain sweeper which extends radially from a central opening into which the grain sweeper directs grain as the grain sweeper travels in a circular path about the central opening, said grain sweeper mechanism further comprising an auger member positioned within a shroud member, said auger member being adapted to direct grain toward the central opening of a grain storage container, said drive mechanism comprising:
    a housing operatively coupled with the grain sweeper mechanism;
    a crawler track mounted within the housing for engaging a floor portion of the grain storage container and for driving the grain sweeper mechanism about the central opening;
    a drive sprocket for drivingly engaging the crawler track;

a tensioning sprocket which engages the crawler track; and said crawler track further comprises laterally extending cleat means for engaging grain and the floor portion of the grain storage container for supporting and propelling the housing and grain sweeper mechanism, said cleat means being spaced a substantial distance fore and aft from one another, wherein said fore and aft spacing of said cleat means allows the cleat means to dig into grain beneath the crawler track as the crawler track is driven by the drive sprocket, and said cleat means extend in a vertical dimension a significant distance for displacing grain rearwardly and laterally that has been loosened by the digging of the cleat means into grain, each of said cleat means having an effective surface area of sufficient size to establish friction for driving the grain sweeper mechanism about the central opening when said surface engages grain and a floor portion of the grain storage container, and said effective surface area is sufficiently small to allow the cleat means to dig into grain.

9. The invention of claim 8, wherein said crawler track further comprises a chain mechanism to which the cleat means are coupled, said chain mechanism being engaged by the drive sprocket and tensioning sprocket.

10. The invention of claim 8, and further comprising a first set of weights supported by the housing generally directly above the drive sprocket, and a second set of weights supported by the housing generally directly above the tensioning sprocket, the amount of said weights being adjustable for altering the balance of weight transmitted to the crawler track.

11. The invention of claim 9, and further comprising a first set of weights supported by the housing generally directly above the drive sprocket, and a second set of weights supported by the housing generally directly above the tensioning sprocket, the amount of said weights being adjustable for altering the balance of weight transmitted to the crawler track.

12. The invention of claim 8, and further comprising:

a deflector mounted to the housing directly in front of the crawler track, said deflector being biased downwardly for scraping and deflecting material from the floor portion in front of the crawler track as the grain sweeper travels forwardly during operation.

13. The invention of claim 10, and further comprising:

a deflector mounted to the housing directly in front of the crawler track, said deflector being biased downwardly for scraping and deflecting material from the floor portion in front of the crawler track as the grain sweeper travels forwardly during operation.

14. A crawler track mechanism adapted for driving an apparatus across and through granular substances positioned on a floor, said track mechanism comprising:

a chain mechanism engagable with a sprocket which transmits driving force to the chain mechanism; and a plurality of laterally extending cleat means coupled with the chain mechanism for engaging the floor with a surface area which is sufficiently large to establish friction for driving the grain sweeper mechanism about the central opening when said surface engages grain and when said surface engages a floor portion of the grain storage container, and said surface area is sufficiently small to allow the cleat means to dig into grain, a space being defined between adjacent cleat means for allowing said cleat means to dig into grain beneath the cleat means, said cleat means extending substantially in a vertical dimension for paddling and moving said granular substances as the cleat means move with respect to the floor.

15. A mechanism comprising:

a grain sweeper mechanism which extends radially from a central opening into which the grain sweeper directs grain as the grain sweeper travels in a circular path about the central opening, said grain sweeper mechanism further comprising an auger member adapted to direct grain toward the central opening of a grain storage container;

a housing operatively coupled with the grain sweeper mechanism;

a crawler track mounted within the housing and adapted for engaging a floor portion of the grain storage container and for driving the grain sweeper mechanism about the central opening; and a deflector mounted to the housing directly in front of the crawler track, said deflector being biased downwardly for deflecting material from the floor portion in front of the crawler track as the grain sweeper travels forwardly during operation.

16. A mechanism comprising:

a grain sweeper mechanism which extends radially from a central opening into which the grain sweeper directs grain as the grain sweeper travels in a circular path about the central opening, said grain sweeper mechanism further comprising an auger member adapted to direct grain toward the central opening of a grain storage container;

a housing operatively coupled with the grain sweeper mechanism;

a crawler track mounted within the housing and adapted for engaging a floor portion of the grain storage container and for driving the grain sweeper mechanism about the central opening said crawler track further comprises laterally extending cleats adapted to engage grain and the floor portion of the grain storage container, said cleats being spaced a distance fore and aft from one another; and a deflector mounted to the housing directly in front of the crawler track, said deflector being biased downwardly for deflecting material from the floor portion in front of the crawler track as the grain sweeper travels forwardly during operation.

17. A mechanism comprising:

a grain sweeper which extends radially from a central opening into which the grain sweeper directs grain as the grain sweeper travels in a circular path about the central opening, said grain sweeper mechanism further comprising an auger member adapted to direct grain toward the central opening of a grain storage container;

a housing operatively coupled with the grain sweeper mechanism;

a crawler track mounted within the housing and adapted for engaging a floor portion of the grain storage container and for driving the grain sweeper mechanism about the central opening;

a drive sprocket engaged with the crawler track, and a tensioning sprocket engaged with the crawler track;

a first set of weights supported by the housing generally directly above the drive sprocket, and a second set of weights supported by the housing generally directly above the tensioning sprocket, the amount of said weights being adjustable for altering the balance of weight transmitted to the crawler track; and a deflector mounted to the housing directly in front of the crawler track, said deflector being biased downwardly for deflecting material from the floor portion in front of the crawler track as the grain sweeper travels forwardly during operation.

18. A drive mechanism for a grain sweeper which extends radially from a central opening into which the grain sweeper directs grain as the grain sweeper travels in a circular path about the central opening, said grain sweeper mechanism further comprising an auger member positioned within a shroud member, said auger member being adapted to direct grain toward the central opening of a grain storage container, said drive mechanism comprising:

a housing operatively coupled with the grain sweeper mechanism;

a crawler track mounted within the housing for engaging a floor portion of the grain storage container and for driving the grain sweeper mechanism about the central opening;

a drive sprocket for drivingly engaging the crawler track;

a tensioning sprocket which engages the crawler track, and said crawler track further comprises laterally extending cleats adapted to engage grain and the floor portion of the grain storage container for supporting and propelling the housing and grain sweeper mechanism, said cleats being spaced a substantial distance fore and aft from one another, wherein said cleats serve to dig into and displace grain beneath the crawler track as the crawler track is driven by the drive sprocket; and a deflector mounted to the housing directly in front of the crawler track, said deflector being biased downwardly for scraping and deflecting material from the floor portion in front of the crawler track as the grain sweeper travels forwardly during operation.

19. A drive mechanism for a grain sweeper which extends radially from a central opening into which the grain sweeper directs grain as the grain sweeper travels in a circular path about the central opening, said grain sweeper mechanism further comprising an auger member positioned within a shroud member, said auger member being adapted to direct grain toward the central opening of a grain storage container, said drive mechanism comprising:

a housing operatively coupled with the grain sweeper mechanism;

a crawler track mounted within the housing for engaging a floor portion of the grain storage container and for driving the grain sweeper mechanism about the central opening;

a drive sprocket for drivingly engaging the crawler track;

a tensioning sprocket which engages the crawler track, and said crawler track further comprises laterally extending cleats adapted to engage grain and the floor portion of the grain storage container for supporting and propelling the housing and grain sweeper mechanism, said cleats being spaced a substantial distance fore and aft from one another, wherein said cleats serve to dig into and displace grain beneath the crawler track as the crawler track is driven by the drive sprocket;

a first set of weights supported by the housing generally directly above the drive sprocket, and a second set of weights supported by the housing generally directly above the tensioning sprocket, the amount of said weights being adjustable for altering the balance of weight transmitted to the crawler track; and a deflector mounted to the housing directly in front of the crawler track, said deflector being biased downwardly for scraping and deflecting material from the floor portion in front of the crawler track as the grain sweeper travels forwardly during operation.

* * * * *